Figure 1:
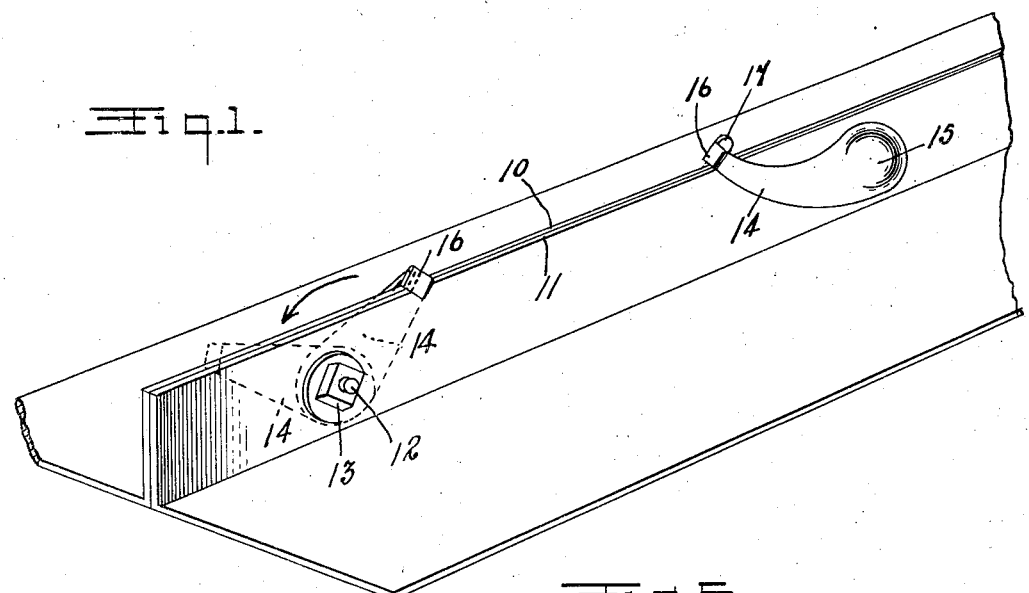

Dec. 25, 1934.    F. J. ADAMS    1,985,272

BOLT LOCK

Filed Sept. 26, 1933

WITNESSES:

INVENTOR
Frederick J. Adams
BY
Joshua R. H. Potts
HIS ATTORNEY

Patented Dec. 25, 1934

1,985,272

UNITED STATES PATENT OFFICE 1,985,272

BOLT LOCK

Frederick J. Adams, Philadelphia, Pa.

Application September 26, 1933, Serial No. 690,969

4 Claims. (Cl. 151—32)

This invention relates to bolt locks, and has for an object to provide improved means for locking a bolt against rotation while a nut is being screwed home.

A further object of the invention is to provide a device which may be of very general utility, but is especially adapted for use in securing together flanges of metal, or other material, as for instance, in the body work for vehicles where parts are relatively inaccessible, or in structural steel erection, where the rigger, because of the location, has only one hand available for use.

A further object of the invention is to provide a bolt having an arm extending therefrom and provided at the end of the arm with means for engaging a part and preventing further rotation of the bolt.

The invention, therefore, comprises a device having a bolt part and an arm extending from that part of the bolt, normally the head, with a hook of return bend type at the end of the arm adapted to hook over a flange and to prevent the rotation of the bolt, it being understood that the invention also contemplates a similar arrangement associated with a nut in the use of which the bolt is rotated instead of the nut.

Figure 2:
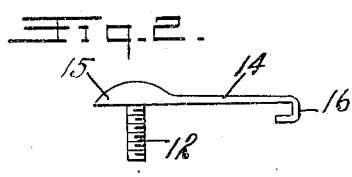
Figure 5:
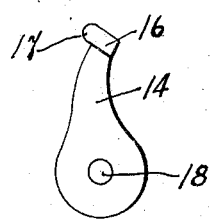
Figure 3:
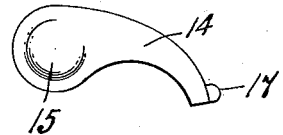
Figure 4:
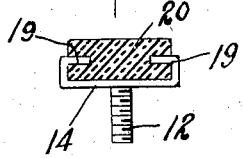

The drawing illustrates several embodiments of the invention and the views therein are as follows:

Figure 1 is a perspective view of a conventional metal organization embodying abutting flanges with the bolt lock shown in inoperative position relative thereto, Figure 2 is a view of the bolt and lock in edge elevation, Figure 3 is a top plan view of the locking arm, Figure 4 is a modification wherein flanges take the place of the bolt head for the purpose of holding a cushioning part, which is shown in transverse section, and Figure 5 is a view in plan of the type employed as a nut.

Like characters of reference indicate corresponding parts throughout the several views.

While the present invention is adapted for a great variety of uses, it is more especially adapted for uses where flanges of metal or the like are to be bolted together, and is so illustrated in the drawing, it being understood, however, that such illustration is merely for the purpose of showing an operative position of the device, without limiting its utility or operativeness in any respect.

So defined, the lock is shown, as being employed to fasten together, flanges 10 and 11 of sheet or other metal construction. The device itself comprises a bolt part 12 which is of such length, size and other specified features as the nature of the work will require. A nut 13 is shown at Figure 1 as being applied to this bolt 12.

Extending from the bolt member 12 is an arm 14 which may be of any desired contour in plane and the exact curvature, as shown in the drawing, is only illustrative, and may be varied according to the whim of the user, or the necessity of use.

The bolt part 12 may be formed integral with the arm 14 or may be formed separately and rigidly secured thereto. At 15 a bolt head is suggested, but it is to be understood that this may be either formed integral or attached.

At the end of the arm opposite the bolt member 12 a return bend hook 16 is provided, of the proper size and contour, to hook over the combined edges of the flanges or other structural work on which it is employed, as indicated more particularly at Figure 1.

This hook member is preferably, though not necessarily, provided with an offset finger 17, so that when stress is applied for the purpose of removing the nut 13, the arm will swing in the direction indicated by the arrow at Figure 1, and will again engage against the flanges by the employment, particularly, of the offset 17, and will, therefore, permit the nut to be removed, or the bolt to be fractured, in case of such corroded condition as will prevent its removal.

At Figure 5 the device is shown as contemplating a nut having a threaded opening 18 for the receipt of the bolt. In the latter instance, of course, the bolt itself is rotated for the purpose of screwing home, relative to the nut, the reverse action being the same as before noted.

In any event, when the nut and bolt are to be tightened, the arms will assume the position shown in full lines at Figure 1, whereby the bolt is held against rotation beyond its engagement with the flanges. When the nut and bolt are to be separated, the arm will rotate to the position shown at 14′ in Figure 1, where, by engagement with the flange, the bolt is held against further rotation and the nut may be either removed, or the bolt severed.

In the type shown at Figure 4, flanges 19 are formed upon the plane of the arm 14 to engage a cushioning member 20 which may be of rubber or the like.

This type, while of varied utility, will find a considerable field of usefulness in replacing the lacing of an automobile hood or other similar organization.

Of course, the bolt lock herein described may be modified and changed in various ways without departing from the invention herein set forth and hereafter claimed.

I claim:—

1. A bolt lock comprising a bolt having a head, an arm of sheet material extending from the head, and a return bend formed at the end of the arm.

2. A bolt lock comprising a bolt having a head, an arm of sheet material extending from the head on a plane perpendicular to the axis of the bolt, and a return bend formed upon the end of the arm in the direction of the extension of the bolt part.

3. A bolt lock comprising a bolt having a head, an arm of sheet material extending from the head, a return bend formed at the end of the arm, and a lateral offset formed upon the returned part of the bend.

4. A bolt lock comprising a bolt having a head, a curved arm of sheet material extending from the head and in a plane perpendicular to the axis of the bolt, the end of the arm being bent into a return bend upon a line which, extended, approaches nearer to the axis of the bolt than the length of the arm.

FREDERICK J. ADAMS.